United States Patent
Tyrrell et al.

(10) Patent No.: US 9,312,758 B2
(45) Date of Patent: Apr. 12, 2016

(54) DC-DC CONVERTER EFFICIENCY IMPROVEMENT AND AREA REDUCTION USING A NOVEL SWITCHING TECHNIQUE

(75) Inventors: Julian Tyrrell, Swindon (GB); Biren Minhas, Bristol (GB); Anna Hedley, Swindon (GB); Stuart Levine, Hants (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 866 days.

(21) Appl. No.: 12/661,515

(22) Filed: Mar. 18, 2010

(65) Prior Publication Data

US 2011/0204861 A1 Aug. 25, 2011

(30) Foreign Application Priority Data

Feb. 25, 2010 (EP) .................................. 10368016

(51) Int. Cl.
*H02M 3/156* (2006.01)
*H02M 3/07* (2006.01)

(52) U.S. Cl.
CPC ................ *H02M 3/156* (2013.01); *H02M 3/07* (2013.01)

(58) Field of Classification Search
CPC ..... H02M 3/156; H02M 3/1588; H02M 1/36; H02M 3/07; H02M 3/073; G05F 1/613
USPC ................ 323/222, 223, 224, 282, 284, 291; 363/59, 60; 327/536
See application file for complete search history.

(56) References Cited

U.S. PATENT DOCUMENTS

| | | | |
|---|---|---|---|
| 4,322,786 A | 3/1982 | Weber | |
| 4,344,036 A * | 8/1982 | Dakroub et al. | 327/160 |
| 5,077,652 A | 12/1991 | Faley | |
| 5,498,995 A | 3/1996 | Szepesi et al. | |
| 5,499,184 A | 3/1996 | Squibb | |
| 5,751,565 A | 5/1998 | Faulk | |
| 6,420,858 B1 | 7/2002 | Kitagawa et al. | |
| 6,469,914 B1 | 10/2002 | Hwang et al. | |
| 6,587,357 B1 | 7/2003 | Halamik et al. | |
| 7,382,635 B2 * | 6/2008 | Noda | H02M 3/07 307/110 |
| 7,466,189 B2 * | 12/2008 | Sohara | H02M 3/07 327/536 |
| 7,528,590 B2 | 5/2009 | Wei | |
| 2001/0038279 A1 * | 11/2001 | Jaworski | 323/288 |
| 2005/0024125 A1 * | 2/2005 | McNitt | H02M 3/073 327/536 |
| 2005/0122751 A1 * | 6/2005 | Zeng et al. | 363/50 |
| 2005/0189984 A1 * | 9/2005 | Kawagoshi | 327/538 |
| 2005/0219878 A1 * | 10/2005 | Ito et al. | 363/59 |

(Continued)

FOREIGN PATENT DOCUMENTS

JP   11 275857   10/1999

OTHER PUBLICATIONS

European Search Report 10368016.1-1242, Jun. 23, 2010, Dialog Semiconductor GmbH.

*Primary Examiner* — Fred E Finch, III
*Assistant Examiner* — Gustavo Rosario Benitez
(74) *Attorney, Agent, or Firm* — Saile Ackerman LLC; Stephen B. Ackerman

(57) ABSTRACT

A control logic of a switched DC-to-DC converter allows continuous switching to bring the DC-to-DC converter to a final output value during a startup phase, it allows skipping of clock switching pulses if they are not needed and allows burst mode of switching pulses dependent on a load applied to the output voltage of the DC-to-DC converter. No digital or analog regulator is required for the control logic.

16 Claims, 2 Drawing Sheets

(56) References Cited

U.S. PATENT DOCUMENTS

| | | |
|---|---|---|
| 2007/0013434 A1* | 1/2007 | Peschke .................. 327/536 |
| 2007/0052395 A1 | 3/2007 | Belch |
| 2007/0070659 A1* | 3/2007 | Sawtell .................. 363/21.01 |
| 2008/0136341 A1 | 6/2008 | Araki et al. |
| 2008/0310194 A1 | 12/2008 | Huang et al. |
| 2009/0102441 A1* | 4/2009 | de Cremoux et al. .......... 323/271 |
| 2010/0264891 A1* | 10/2010 | Lee .................. 323/282 |

* cited by examiner

US 9,312,758 B2

DC-DC CONVERTER EFFICIENCY IMPROVEMENT AND AREA REDUCTION USING A NOVEL SWITCHING TECHNIQUE

BACKGROUND OF THE INVENTION (1) Field of the Invention

This invention relates generally to direct current-to direct current (DC-to-DC) converters and relates more specifically to DC-to-DC converters using a novel switching technique.

(2) Description of the Prior Art

Energy saving, i.e. increasing efficiency of electronic systems is getting more and more important. Designers of power systems strive to minimize losses and heat. DC-to-DC converters, which are produced in millions, play an important role in the effort to save energy by improving their efficiency.

Switching DC-to-DC converters can either be designed for continuous switching or in pulse skip mode.

The efficiency reduces for both modes as the switching increases with load.

In continuous mode, the clock is switching continuously and hence the circuit has an associated switching loss.

In pulse skip mode, there is an additional overhead in area and power for the regulator to control the pulse skipping. For pulse skip switching, the clock is continuous till the output achieves a final voltage, and then starts pulse-skipping (skip-mode), where the clock is only available to the circuit when the output voltage falls below a pre-determined level. This clock goes away again once the output is back at the required level. With load applied to the output, the circuit has to switch a lot more to keep the output at the required level.

It is a challenge for the designers of circuits for switching DC-to-DC converters to improve the efficiency of these converters, to reduce the area required of the circuits and to reduce an average input current.

There are known patents or patent publications dealing with switching DC-to-DC converters.

U.S. Pat. No. 7,528,590 to Wei proposes a DC-to-DC boost converter circuit receiving a DC input voltage and converts it to a DC output voltage at a different voltage level than the DC input voltage. The DC to DC boost converter includes a switching power converter for receiving the input voltage on an input and converting the input voltage to an output as the DC output voltage in response to pulse control signals. A switching controller generates the pulse control signals during a switching cycle. The switching controller further includes pulse-skipping circuitry for generating a pulse width modulated signal to the switching power converter.

U.S. Pat. No. 6,469,914 to Hwang et al. discloses a controller for a pulse width modulating (PWM) power converter. The controller monitors an output voltage and a current through a magnetic element for modulating a duty cycle of a main power switch. The controller is an eight-pin integrated circuit that controls either a forward converter or a post regulator without internal modifications. The monitored current of the forward converter forms a positive sensing signal. The monitored current of the post regulator forms a negative sensing signal. A current sense circuit of the controller forms an absolute value of either sensing signal.

U.S. Pat. No. 6,420,858 to Kitagawa et al. describes a DC-to-DC converter circuit having a power saving mode, and which achieves a high conversion efficiency without using a sense resistance. The DC-to-DC converter circuit includes a triangular wave generation circuit to generate a triangular wave signal and a differential amplifier to receive the triangular wave signal and to generate an output signal.

Furthermore there are four more patents dealing with startup circuits for bandgap voltage reference generators:

U.S. Pat. No. 5,751,565 to Faulk describes a switching converter that delivers power to a load at a regulated load voltage based upon switch control pulses from a pulse width modulator (PWM), a circuit monitors directly the level of the load voltage and, when it rises to an upper threshold, the circuit generates a feedback signal for the PWM that interrupts its generation of switch control pulses until the load voltage drops to a lower threshold voltage.

U.S. Pat. No. 5,077,652 to Faley discloses a direct current (DC) to alternating current (AC) converter that receives a direct current signal from an input power source to drive a load. A power module, controlled by a central processing unit, includes a DC-to-DC voltage booster that boosts the direct current signal from approximately 12 volts to 150 volts. A DC-to-AC inverter, which is also controlled by the CPU, converts the boosted DC voltage from DC to a 60 Hz AC output signal used to drive the load. The power module includes a voltage feedback path and a current feedback path for regulating the AC output voltage signal in response to changes in the load.

U.S. Pat. No. 5,499,184 to Squibb discloses a power switch circuit including a small signal transformer and a low power oscillator for detecting the power switch while isolating it from the primary of the power supply. When the power switch is off, or is otherwise pressed to turn off the power supply, the oscillator charges a capacitor. A sensing and control circuit coupled to the oscillator and capacitor grounds a vital signal of the power supply keeping the power supply turned off. In one embodiment, when the switch is turned on, it shorts the signal transformer disabling the oscillator, so that the capacitor is discharged and the sensing and control circuit releases the vital signal.

U.S. Pat. No. 5,498,995 to Szepesi et al. describes Improved controller circuitry for a switching power supply. The switching power supply is of the type having a transformer having primary and secondary windings for generating an output voltage at the secondary winding, a power switch for driving the primary winding, and controller circuitry 100 for activating the power switch. The improved controller circuitry includes an oscillator and frequency shift means. The oscillator generates PWM pulses having a predetermined frequency for use in activating the power switch.

SUMMARY OF THE INVENTION

A principal object of the present invention is to achieve methods and systems for a switched DC-to-DC converter to improve its efficiency.

A further object of the invention is to achieve switched DC-to-DC converter using pulse-skip switching A further object of the invention is to achieve a switched DC-to-DC converter requiring minimal area on an integrated circuit.

A further object of the invention is to achieve a switched DC-to-DC converter having a reduced average input current.

A further object of the invention is to achieve a switched DC-to-DC converter wherein no additional analog circuitry is required the control of the switching pulses.

In accordance with the objects of this invention a method to improve the efficiency of switched DC-to-DC converters has been achieved. The method invented comprises, firstly, the steps of (1) providing a switched-mode DC-to-DC converter and a control logic controlling clock pulses of the DC-to-DC converter, and (2) applying continuous switching pulses initiated by the control logic to the DC-to-DC converter during a startup phase until a final output voltage is reached. Furthermore the method invented comprises the steps of (3) skipping cycles of the switching pulses if they are not needed during operational phase, and (4) applying a number of continuous switching pulses depending on an actual load applied to the output voltage.

In accordance with the objects of this invention a system for a DC-to-DC conversion having an improved efficiency has been achieved. The system invented comprises a switched DC-to-DC converter, and a control logic block, controlling clock switching pulses of said switched DC-to-DC converter allowing the DC-to-DC converter to skip cycles when they are not needed and allowing a burst mode of clock switching pulses dependent on a load, wherein an analog regulator is not needed to control the clock switching pulses.

BRIEF DESCRIPTION OF THE DRAWINGS

In the accompanying drawings forming a material part of this description, there is shown.

DESCRIPTION OF THE PREFERRED EMBODIMENTS

Circuits and methods for switched DC-to-DC converter having an improved efficiency are disclosed. The invention can be applied for any kind of switched DC-to-DC converters, such as buck converters, boost converters, buck-boost converters, etc A preferred embodiment of the invention is designed to be used with a capacitive 160 switched charge pump (CP). A switched capacitive charge-pump has a natural maximum output voltage purely dependant on the input supply voltage and number of capacitors switched; for example a 3V supply with 2 switched capacitors has a unloaded output of 9V.

Figure 1:
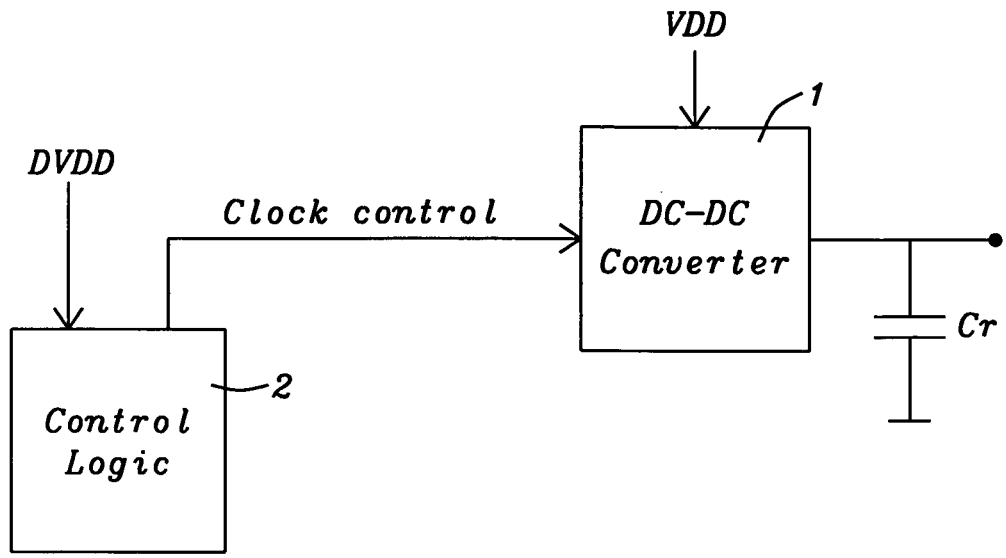
FIG. 1 shows a block diagram of a switched DC-to-DC converter of the present invention.

FIG. 1 shows a block diagram of a switched DC-to-DC converter of the present 165 invention. FIG. 1 shows a switched DC-to-DC converter 1, having a supply voltage Vdd, an output voltage Vout and an output capacitor C, smoothing the output voltage Vout, a control logic 2, having a digital power supply voltage DVdd, controlling a clock of the DC-DC converter 1.

In a preferred embodiment of the present invention the DC-to-DC converter 1 initially is used in a continuous mode to bring the output voltage Vout to its final value. However a switching clock of the DC-to-DC converter 1 is controlled by a digital circuitry (control logic 2) to start pulse skipping after the output voltage Vout has reached its target value desired. The frequency of the skip can also be manually controlled.

The "frequency of the skip" is the period over which the clock is suspended; i.e. has no activity. This is the number of clock pulses that are missed between each generated single pulse. For example a skip of 3 would generate every 4$^{th}$ pulse, i.e. generate 1 clock then miss three clocks. The frequency of the skip can be manually selected to provide the optimum efficiency and power consumption.

It should be noted that the output voltage is not required to be monitored and hence no digital or analog regulator, as in most prior art power converters, is required. We generate the stream of continuous pulses for a fixed period of time; which, given the ratio of capacitance of the switched capacitor size (or value) to the capacitance of the output storage, determines the time taken to reach the un-loaded output voltage. The length of time that the continuous pulses are generated for is user selectable (usually from a pre-determined list).

The control can also be used to allow for a few continuous switching clocks (burst) to top-up the output voltage depending on the load applied to the output voltage. So the skip mode and burst mode allows the converter to skip cycles when they are not needed, which greatly improves the efficiency. Therefore an input average current is reduced compared to prior art.

Since there is no requirement for an analog regulator to control this switching, it reduces the overall area required on an integrated circuit (IC) and power consumption required for the skipping in the traditional method. No regulation loop is used in the system. The output voltage is based purely on the input voltage and number of stages of switched capacitor used and the load current on the charge pump output. It also enables a more accurate control of the switching clock through the logic circuitry. This enables to reduce the average power consumption of the DC-to-DC converter in comparison to the traditional switching topologies.

Figure 2:
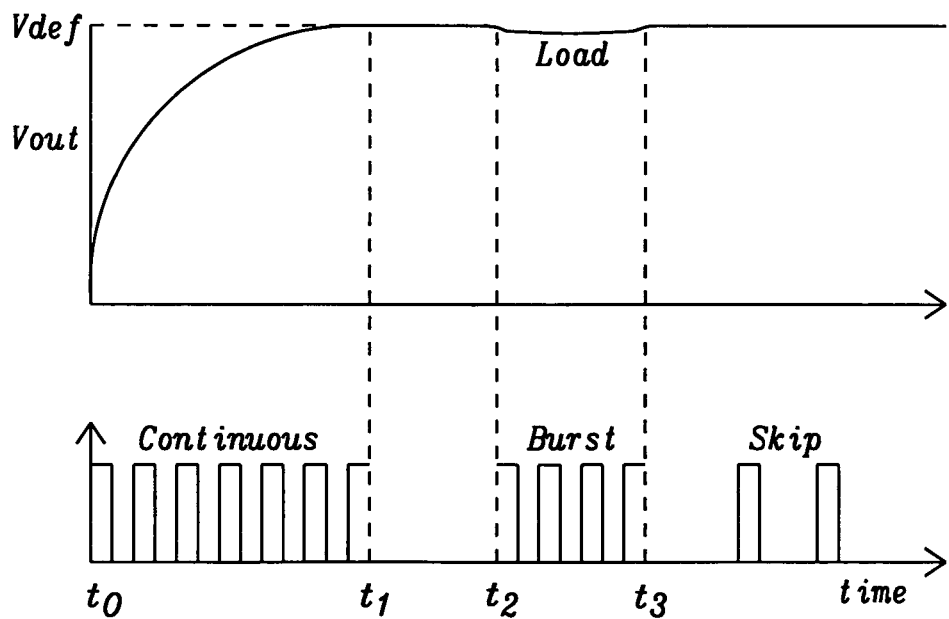
FIG. 2 shows time diagrams of an output voltage and of related switching clock pulses.

FIG. 2 shows time diagrams of the output voltage Vout and of the switching clock 205 pulses. The start-up phase of the DC-to-DC converter starts at t0 and at the end of the start-up phase at point of time t1 the output voltage Vout has reached its final value Vdef. During the start-up phase between t0 and t1 continuous switching is applied. After the start-up phase between t0 and t1 an operational phase begins.

Figure 3:
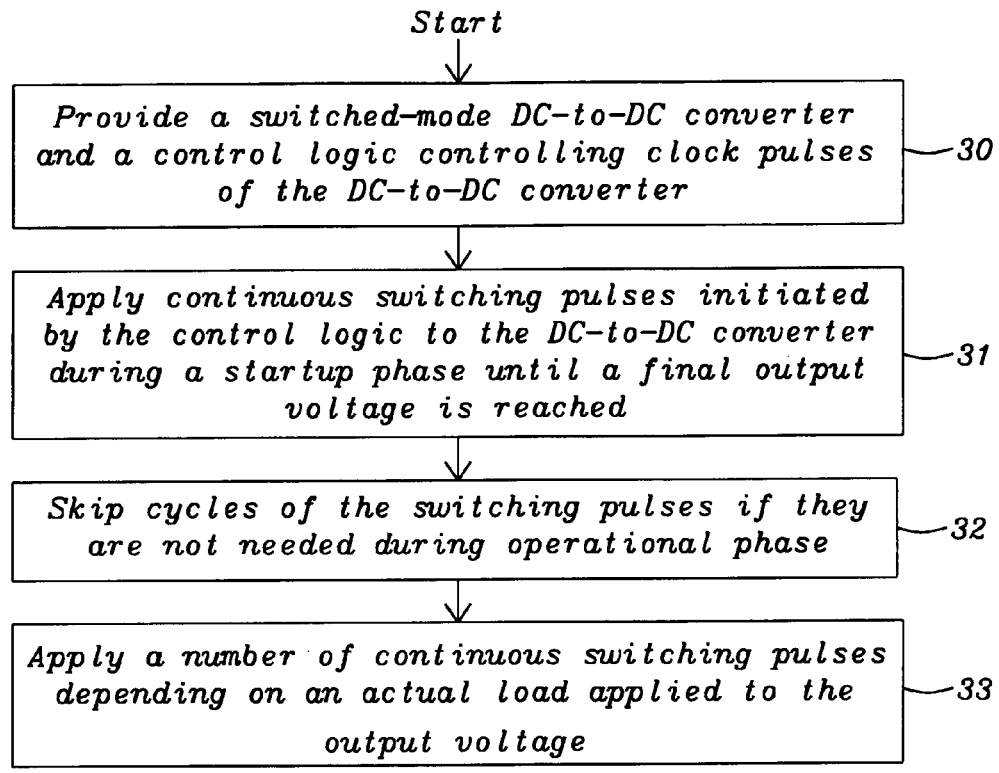
FIG. 3 illustrates a flowchart of a method invented to improve the efficiency of switched DC-to-DC converters.

Between t1 and t2 no significant load is present and no pulses are generated. Between t2 and t3 a significant load is present, the output voltage Vout goes slightly down and burst pulses are applied to keep the output voltage Vout close to the defined level Vdef. After t3 no significant load is present and skip mode prevails, only interrupted by some occasional pulses to keep the output voltage Vout close to the defined level Vdef. Between the "burst" clock cycles the control logic reverts back to "skip" clock cycles FIG. 3 illustrates a flowchart of a method invented to improve the efficiency of switched DC-to-DC converters. A first step 30 describes the provision of a switched-mode DC-to-DC converter and a control logic controlling clock pulses of the DC-to-DC converter. A next step 31 illustrates applying continuous switching pulses initiated by the control logic to the DC-to-DC converter during a startup phase until a final output voltage is reached. Step 32 describes skipping cycles of the switching pulses if they are not needed during operational phase. Step 33 discloses applying a number of continuous switching pulses depending on an actual load applied to the output voltage.

Figure 4:
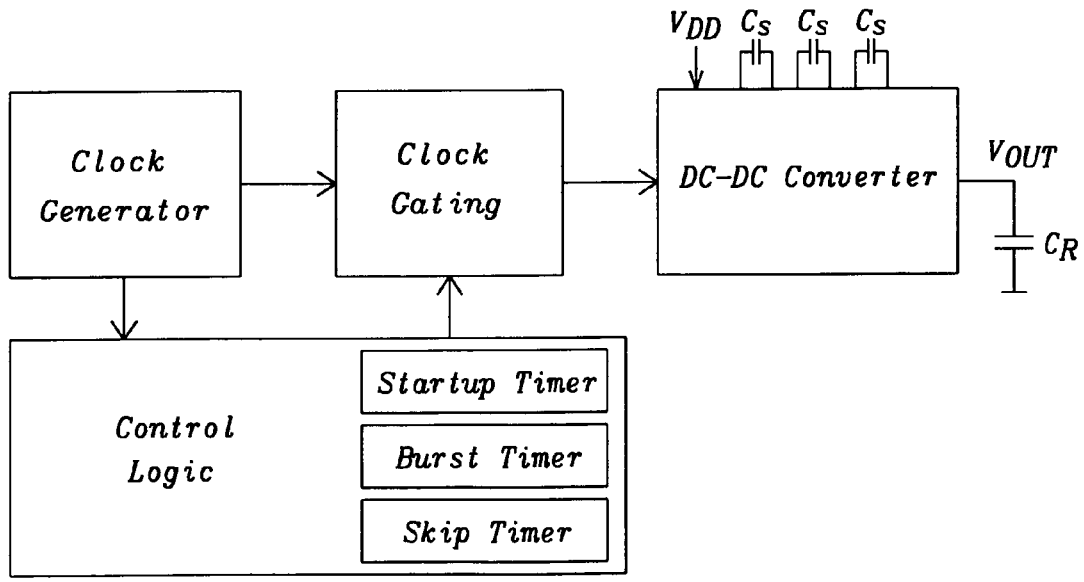
FIG. 4 shows the structure of the DC-DC converter with the switch capacitors, $C_S$, and the output capacitor $C_R$

FIG. 4 shows the structure of the DC-DC converter with the switch capacitors, $C_S$, and the output capacitor $C_R$. The ratio of $C_S$ to $C_R$ and the number of stages within the DC-DC converter determines the number of clock cycles required to bring the output voltage, $V_{OUT}$, to its final value; the final value being the input supply voltage, $V_{DD}$, multiplied by the number of stages of switched capacitors, in this example 3. For example if the input supply $V_{DD}$ is 3V and there are 3 switched capacitors the un-loaded output voltage, $V_{OUT}$, will be 12V. The circuit comprises of a clock generator which provides the time base for the circuit operation; a control logic block that contains the startup timer, the burst timer and the skip timer; a clock gating circuit that controls the switching of the converter; and a DC-DC converter which controls the switching of the $C_S$ capacitors. The startup, burst and skip timers are user programmable to allow flexibility of the circuit to accommodate different capacitor values, number of switching stages, and different output load characteristics.

The burst/skip control is determined by the expected load current demand on the charge pump output. As the system controls the switching of the load on the charge pump, we have prior knowledge when the charge pump load will increase. To accommodate the increased load the CP clock is set to "burst" which increases the available output current.

The invention exploits the fact that the output voltage of the CP will not change if there is no load current. When the load current increases (due to load switching transients) the CP is run in "burst" mode, which significantly increases the output, drive capability.

The trade-off of the invention is to minimize the total number of charge pump clocks to output voltage during load conditions. The losses due to switching the capacitors in the charge pump are reduced by "skipping", saving the transient currents and hence overall supply current of the system, i.e. between the "burst" clock cycles the control logic reverts back to "skip" clock cycles.

While the invention has been particularly shown and described with reference to the preferred embodiments thereof, it will be understood by those skilled in the art that various changes in form and details may be made without departing from the spirit and scope of the invention.

What is claimed is:

1. A method to improve the efficiency of a switched DC-to-DC converter, comprising the following steps:
   (1) providing the switched-mode DC-to-DC converter comprising a charge pump and a control logic capable of controlling clock pulses of the DC-to-DC converter;
   (2) applying continuous switching pulses initiated by the control logic to the DC-to-DC converter during a startup phase for a predetermined period of time to reach a desired output voltage;
   (3) skipping cycles of the switching pulses if they are not needed during an operational phase wherein a skip control is determined by an expected load current demand on a charge pump output, wherein the expected load current is known by the control logic controlling a switching of a load on the charge pump, providing a forecast when the charge pump load will change, wherein the forecast is based on load switching transients; and
   (4) applying a number of burst switching pulses, wherein a burst control is determined by the expected load current demand on the charge pump output;
wherein a stream of continuous pulses is generated for a fixed period of time; which, given a ratio of a capacitance of switched capacitor size to an output storage capacitance, determines the time taken to reach an un-loaded output voltage target.

2. The method of claim 1 wherein said switched-mode DC-to-DC converter is a buck converter.

3. The method of claim 1 wherein said switched-mode DC-to-DC converter is a boost converter.

4. The method of claim 1 wherein said switched-mode DC-to-DC converter is a buck-boost converter.

5. The method of claim 1 wherein said switched-mode DC-to-DC converter is of a switched capacitive type.

6. The method of claim 1 wherein a switching clock of the DC-to-DC converter is controlled by the control logic to start pulse skipping after the output voltage has reached the un-loaded output voltage target.

7. The method of claim 6 wherein a frequency of the pulse skipping can also be manually controlled.

8. The method of claim 1 wherein the control logic is also used to allow for a few continuous switching clocks to top-up the output voltage depending on the load applied to the output voltage.

9. The method of claim 8 wherein an efficiency of the DC-to-DC converter is improved because the skip mode and burst mode allows the DC-to-DC converter to skip cycles when they are not needed.

10. The method of claim 1 wherein a total number of charge pump clock pulses to an output voltage is minimized during load conditions based on the expected load current, wherein the control logic skips cycles of the charge pump clock pulses between burst clock cycles.

11. The method of claim 1 wherein in order to accommodate a charge pump to an increased load based on the expected load current a charge pump clock is set to burst mode which increases an available output current.

12. A system for a DC-to-DC converter having an improved efficiency, comprises:
   a switched DC-to-DC converter comprising a charge pump; and
   a control logic block, configured to control clock switching pulses of said switched DC-to-DC converter applying continuous switching pulses initiated by the control logic to the DC-to-DC converter during a startup phase for a predetermined period of time to reach a final output voltage and allowing the DC-to-DC converter to skip cycles when they are not needed, wherein a skip control is determined by an expected load current demand on a charge pump output and wherein the expected load current is known by the control logic controlling a switching of a load on the charge pump, providing a forecast when the charge pump load will change, wherein the forecast is based on load switching transients, and allowing a burst mode of clock switching pulses, wherein a burst control is determined by the expected load current demand on the charge pump and wherein the control block is configured to generate a stream of continuous pulses for a fixed period of time; which, given a ratio of a capacitance of switched capacitor size to an output storage capacitance, determines the time taken to reach an un-loaded output voltage target.

13. The system of claim 12 wherein said switched-mode DC-to-DC converter is a buck converter.

14. The system of claim 12 wherein said switched-mode DC-to-DC converter is a buck converter.

15. The circuit of claim 12 wherein said switched-mode DC-to-DC converter is a buck-boost converter.

16. The circuit of claim 12 wherein said switched-mode DC-to-DC converter is of a switched capacitive type.

* * * * *